Patented Sept. 19, 1939

2,173,689

UNITED STATES PATENT OFFICE 2,173,689

NONCORROSIVE ANTIFREEZE LIQUID

Headlee Lamprey, Buffalo, N. Y., assignor to Carbide and Carbon Chemicals Corporation, a corporation of New York No Drawing. Application July 3, 1937, Serial No. 151,839

13 Claims. (Cl. 252—5)

The invention is concerned with new liquid compositions of non-corrosive and anti-free properties, which are especially adapted for use as cooling fluids in internal combustion engines. It relates particularly to improved inhibitor materials for preventing metal corrosion in automobile cooling systems employing anti-free liquids containing alcohols.

Many kinds of alcohols are now in use as freezing point depressants in cooling fluids, including methanol, ethanol, propanol, and other monohydroxy alcohols, as well as the polyhydroxy alcohols, such as ethylene glycol, propylene glycol, diethylene glycol and glycerol. In the compositions proposed by this invention any of these alcohols may be used, and all of the saturated aliphatic hydroxy compounds or mixtures thereof are intended to be included where alcohols are broadly referred to in the specification and claims.

Pure alcohols are not inherently corrosive to metals, but under conditions of use as a freezing point depressant in automobile cooling systems there are usually encountered factors through which a corrosive action is induced in the cooling fluid. Normally the alcohol is diluted with water on addition to the cooling system and in circulation therethrough is constantly subjected to agitation in the presence of air. Accompanying this aeration there may also be encountered a general or localized overheating of the cooling fluid, leakage of exhaust gas or other foreign materials into the system, and numerous other conditions which are conducive to reactions causing metal corrosion. It has, therefore, been considered quite necessary to provide means for preventing or retarding induced corrosive conditions in alcohol anti-freeze solutions, and a common expedient for this purpose consists in the addition to the alcohol of corrosion inhibiting materials. Many inhibitor compounds have been suggested in the art, but through only partial effectiveness or other limitations in extended use, they have not proven to be entirely satisfactory.

It is an object of this invention to provide improved corrosion inhibitor compositions for alcohol anti-freeze liquids which are effective to protect all metals of a cooling system, and maintain substantially non-corrosive conditions in a cooling fluid employing an alcohol either in full strength or in dilution with water.

I have found that a mixture of a soluble nitrite, particularly an alkali metal nitrite, and a soluble salt of certain unsaturated organic acids affords excellent protection for all metals of the usual cooling system, including iron, copper, brass, solder and aluminum and, in very small quantities of each component, will maintain non-corrosive conditions in an alcohol cooling fluid under all normal operation. The preferred organic salt compounds are derivatives of an unsaturated carboxylic acid having the general type formula R—CH=CH—COOH, in which R represents an organic radical such as another carboxyl group, a methyl group, a phenyl group or a furyl group. Substitution of an alkali metal for the carboxyl hydrogen of this formula provides salts of especially good inhibiting function, as represented by the specific compounds sodium crotonate, sodium cinnamate, sodium maleate and sodium furyl acrylate.

Nitrite salts of sodium and potassium have heretofore been used as corrosion inhibitors, but this type of salt is limited in its inhibiting action only to certain metals. It affords no protection for solder, which is commonly used in cooling systems, and often tends to aggravate corrosion of this metal. The unsaturated organic salts show a protective action for solder, as well as for the other metals in contact with the cooling fluid, and this component not only supplements the inhibiting function of the nitrite salt, but produces results in mixture therewith quite unexpected from the additive action of the two constituents. It is a fact that the inhibitor mixture of this invention provides corrosion protection over an acidity range which normally would completely destroy the inhibiting action of the individual components. This increases the value of the inhibitor under especially severe corrosive conditions and tends to prolong its useful life.

It also appears that unique results, which cannot now be explained, may be attributed to the double bond in the organic salt, and its particular position in the molecular structure. Evidence of this is shown by the fact that the saturated salt sodium hydrocinnamate is not nearly as effective in inhibiting function as sodium cinnamate, and vinyl acetate, an isomer of crotonic acid, but in structure showing a different position of the double bond, is greatly inferior to the latter acid as a corrosion inhibitor.

Only very minor quantities of each salt need be added to the alcohol to give effective protection. Although the preferred amount may vary somewhat depending upon the alcohol used and the extent of its water dilution in the cooling fluid, normally 0.05% to 1% by weight of the alcohol of both the nitrite and unsaturated organic salt will produce very satisfactory results.

A mixture of these two compounds alone will provide complete corrosion protection, and are for the purpose of this invention considered to be the essential inhibitor composition. There may, however, be further added, if desired, other inhibitors of known character. An alkaline substance, such as triethanolamine or sodium hydroxide, might be included in small quantities for imparting a reserve alkalinity to the cooling fluid in case unusually severe acid conditions are encountered. Minor quantities of a soluble or emulsifiable oil, in the capacity of a leakage retardant, or anti-leak agents of a gum nature can be added. Coloring materials, a soluble phosphate or nitrate for further specific aluminum protection, and other additive materials may also be employed without affecting the protective function of the essential inhibitor mixture.

A specific anti-freeze composition representative of the invention is one employing ethanol as the freezing point depressant to which there is added in percent by weight of the full strength commercial alcohol 0.40% sodium nitrite and 0.20% sodium crotonate. Another formula giving very satisfactory results, and employing other addition agents with ethylene glycol as the freezing point depressant, contains in percent by weight of the glycol 0.30% sodium nitrite, 0.30% sodium crotonate, 0.10% triethanolamine, 0.05% sodium nitrate, 0.05% gum karaya, and 1.5% of a mixture of sulfonated neat's-foot oil and mineral oil. A substitution of 0.15% sodium cinnamate for the sodium crotonate of the above formula provides another composition very effective in its corrosion protection.

It will be understood that the essential inhibitor mixture can be used with any of the alcohols commonly employed in anti-freeze liquids, and modifications in the specific formulae given can be made to suit any particular cooling fluid. The invention should not be limited other than as defined in the appended claims.

I claim:

1. A non-corrosive anti-freeze liquid comprising an alcohol and an inhibitor essentially composed of a soluble nitrite salt and an alkali metal salt of an acid of the group consisting of maleic, crotonic, cinnamic, and furyl acrylic acids.

2. A non-corrosive anti-freeze liquid comprising an alcohol and an inhibitor essentially composed of an alkali metal nitrite and an alkali metal salt of an acid of the group consisting of maleic, crotonic, cinnamic, and furyl acrylic acids, each of said components being present in an amount of about 0.05% to 1.0% by weight of the alcohol.

3. A non-corrosive anti-freeze liquid comprising an alcohol and an inhibitor essentially composed of a mixture of sodium nitrite and sodium maleate, each of said compounds being present in amount of about 0.05% to 1.0% by weight of the alcohol.

4. A non-corrosive anti-freeze liquid comprising an alcohol and an inhibitor essentially composed of a mixture of sodium nitrite and sodium crotonate, each of said compounds being present in amount of about 0.05% to 1.0% by weight of the alcohol.

5. A non-corrosive anti-freeze liquid comprising an alcohol and an inhibitor essentially composed of a mixture of sodium nitrite and sodium cinnamate, each of said compounds being present in amount of about 0.05% to 1.0% by weight of the alcohol.

6. A non-corrosive anti-freeze liquid comprising ethanol and an inhibitor composed of a mixture of about 0.4% sodium nitrite and 0.2% sodium crotonate.

7. A non-corrosive anti-freeze liquid comprising ethylene glycol and an inhibitor composed of a mixture of sodium nitrite, sodium crotonate, triethanolamine, sodium nitrate, an emulsifiable oil, and a gum.

8. A non-corrosive anti-freeze liquid comprising ethylene glycol and an inhibitor composed of a mixture of about 0.3% sodium nitrite, about 0.3% sodium crotonate, about 0.1% triethanolamine, about 0.05% sodium nitrate, about 1.5% of an emulsifiable oil, and about 0.05% of a gum.

9. A non-corrosive anti-freeze liquid comprising ethylene glycol and an inhibitor composed of a mixture of sodium nitrite, sodium cinnamate, triethanolamine, sodium nitrate, an emulsifiable oil, and a gum.

10. A non-corrosive anti-freeze liquid comprising ethylene glycol and an inhibitor composed of a mixture of about 0.3% sodium nitrite, about 0.15% sodium cinnamate, about 0.1% triethanolamine, about 0.05% sodium nitrate, about 1.5% of an emulsifiable oil, and about 0.05% of a gum.

11. Method of inhibiting corrosion of metals by an alcohol solution in contact therewith, which comprises contacting said solution with metals in the presence of an inhibitor essentially composed of a mixture of a soluble nitrite salt and an alkali metal salt of an acid of the group consisting of maleic, crotonic, cinnamic, and furyl acrylic acids.

12. Method of inhibiting corrosion of metals by an alcohol solution in contact therewith, which comprises contacting said solution with metals in the presence of an inhibitor essentially composed of a mixture of sodium nitrite and sodium cinnamate, each of said compounds being present in an amount of about 0.05% to 1.0% by weight of the alcohol.

13. Method of inhibiting corrosion of metals by an alcohol solution in contact therewith, which comprises contacting said solution with metals in the presence of an inhibitor essentially composed of a mixture of sodium nitrite, sodium crotonate, triethanolamine, sodium nitrate, an emulsifiable oil, and a gum.

HEADLEE LAMPREY.